(12) United States Patent
Simske et al.

(10) Patent No.: US 8,915,450 B2
(45) Date of Patent: Dec. 23, 2014

(54) DUAL DETERENT INCREMENTAL INFORMATION OBJECT

(75) Inventors: Steven J. Simske, Fort Collins, CO (US); A. Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/989,785

(22) PCT Filed: Apr. 27, 2011

(86) PCT No.: PCT/US2011/034148
§ 371 (c)(1),
(2), (4) Date: May 25, 2013

(87) PCT Pub. No.: WO2012/148392
PCT Pub. Date: Nov. 1, 2012

(65) Prior Publication Data
US 2014/0042228 A1    Feb. 13, 2014

(51) Int. Cl.
*G06K 19/06*    (2006.01)
*G06F 21/36*    (2013.01)

(52) U.S. Cl.
CPC .......... *G06K 19/06093* (2013.01); *G06F 21/36* (2013.01)
USPC ...................................................... 235/494

(58) Field of Classification Search
USPC ...................................................... 235/494
See application file for complete search history.

(56) References Cited

U.S. PATENT DOCUMENTS

| 5,288,986 | A | 2/1994 | Pine et al. | |
| 5,496,117 | A * | 3/1996 | Sawada et al. | 400/61 |
| 6,991,164 | B2 | 1/2006 | Lemelson et al. | |
| 7,676,038 | B2 | 3/2010 | Simske et al. | |
| 7,702,162 | B2 | 4/2010 | Cheong et al. | |
| 7,962,383 | B2 * | 6/2011 | Egendorf | 705/30 |
| 2003/0179412 | A1 | 9/2003 | Matsunoshita | |
| 2005/0219634 | A1 | 10/2005 | Murakami | |
| 2006/0016879 | A1 | 1/2006 | Kean | |
| 2007/0041608 | A1 | 2/2007 | Maeno | |
| 2008/0185438 | A1 | 8/2008 | Pinchen et al. | |
| 2008/0304110 | A1 | 12/2008 | Simske | |
| 2010/0245213 | A1 * | 9/2010 | Ideguchi | 345/55 |
| 2010/0299272 | A1 | 11/2010 | Lyons et al. | |

* cited by examiner

*Primary Examiner* — Christle I Marshall

(57) ABSTRACT

Systems and methods for generating a dual deterrent information object (IIO) are provided. A method includes analyzing a dual deterrent IIO to determine a first code, wherein the dual deterrent IIO comprises an IIO comprising a plurality of tiles and an associated mark, wherein each tile in the plurality of tiles represents a data element encoded by color, intensity, or both, and the associated mark comprises information related to the IIO. The first code is confirmed, and, if the first code passes the confirmation a new code comprising a bitstream is generated. The bitstream is overwritten on the plurality of tiles, wherein the dual deterrent IIO is the same size after writing of the bitstream. A new associated mark related to the dual deterrent IIO is generated and the associated mark is overwritten with the new associated mark.

15 Claims, 9 Drawing Sheets

200

300

(A)

(B)

600

DUAL DETERRENT INCREMENTAL INFORMATION OBJECT

CROSS-REFERENCE TO RELATED APPLICATION

Pursuant to 35 U.S.C. §371, this application is a United States National Stage Application of International Patent Application No. PCT/US2011/034148, filed on Apr. 27, 2011, the contents of which are incorporated by reference as if set forth in their entirety herein.

BACKGROUND

Products may include both physical and information-containing items, such as produce, documents, labels, books, software, images, and the like. During the lifecycle of the product, it may progress through a workflow, such as from a manufacturer, through a chain of distributors, and on to a consumer. As used herein, a workflow is a defined set of stages, usually with task at each stage, which a product must pass through during its lifecycle. For example, a document may be drafted by a first person, then flow through a number of different editors, prior to being issued to customers or clients in final form. As another example, a manufacturer may package a product for sale to another manufacturer, such as a bundled software package to be sold with a computer.

A bar code may be associated with a product for numerous reasons. For example, a bar code may protect an associated product from counterfeiting and other falsifications. The same bar code may be used throughout the workflow to identify the product. However, this approach does not enable one to monitor the status of the workflow via the bar code. Multiple bar codes may be added, for example, by each entity within a workflow. This may be used to identify the product as it moves from one stage to the next in its workflow. For example, multiple barcodes may be used to confirm the identity of the last party to handle the product. However, the use of multiple bar codes may take a substantial amount of space.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components.

DETAILED DESCRIPTION

Figure 1:
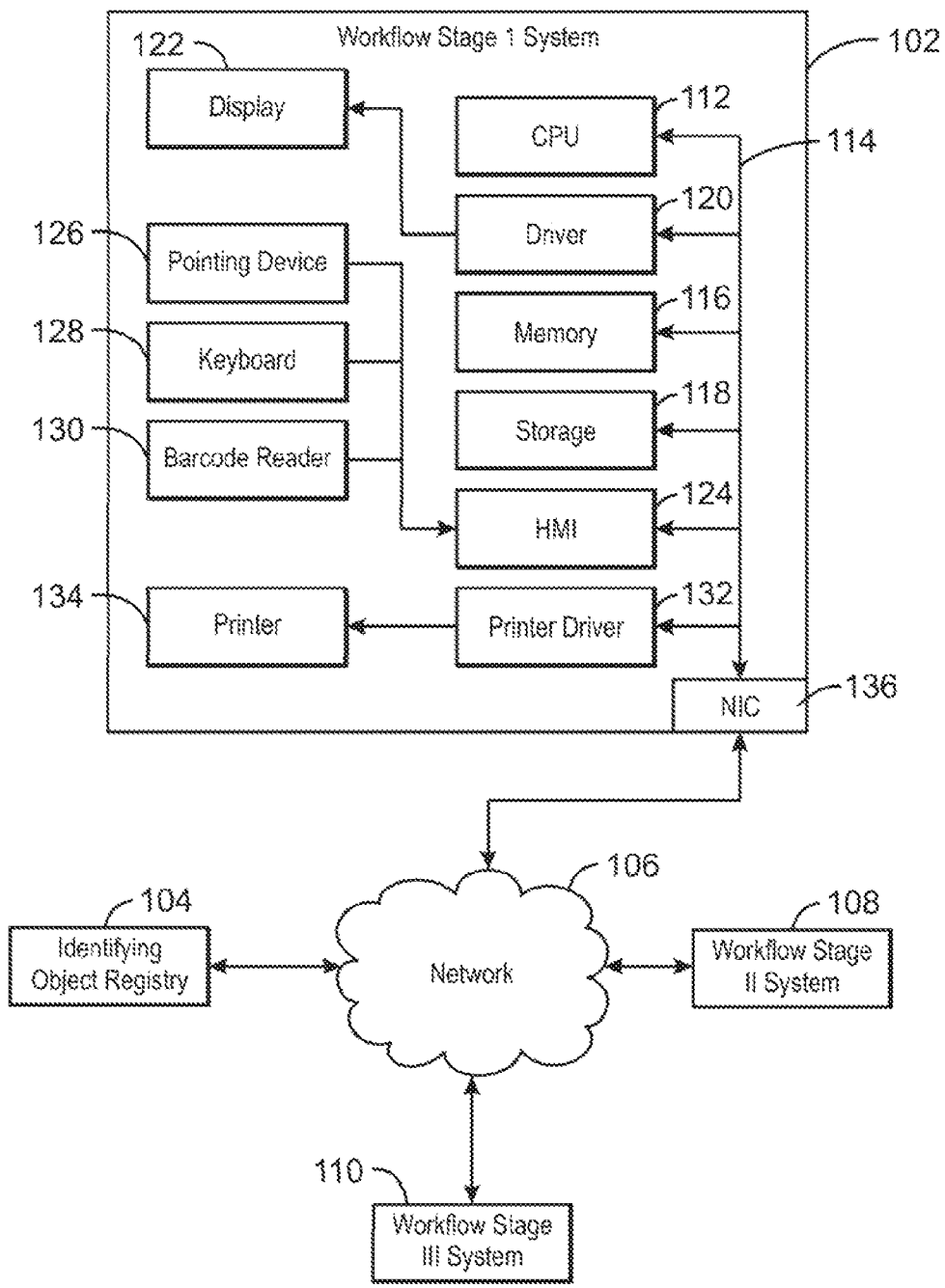
FIG. 1 is a schematic diagram of a system for using a dual deterrent incremental information object (IIO) through a workflow in accordance with an embodiment.

Embodiments discussed herein may be used to generate a dual deterrent incremental information object (IIO). As used herein, a dual deterrent IIO includes an IIO and an associated mark. The associated mark is one, or more, marks or features located in proximity to the IIO which may carry addition information about the product or the IIO between workflow stages. The associated mark may include text, characters, or graphics, and may, itself, be an IIO, barcode, or any other type of symbol or glyph, such as an incrementally completed pie chart showing the amount of information space used in an IIO.

Effectively, the IIO and associated marks in combination provide a multi-agent, multi-device capability to a workflow. In addition, the two parts of the dual deterrent IIO may include distinct information streams. That is, each part can belong to an independent mass serialization data stream and the IIO and associated marks can convey workflow information in different manners. In addition to being independent, the information in the IIO and associated mark can be related to each other in a number of ways. For example, the associated mark may be related to the information in the IIO by replication, scrambling, parity check, compression, digital signature, encryption, or proportion of completion.

As described herein, a workflow is a defined set of stages, usually with one or more tasks at each stage, through which a product may pass during its lifecycle. In an embodiment, the workflow is a process during which documents, information, tasks, or products are passed from one participant to another for action or informative purposes, according to a set of procedural rules.

Workflows may include any number of actions for processing the product. For example, a workflow for an image may include actions such as quality assurance, authentication, forensics, and the like. A supply chain workflow may include actions such as tracking, tracing, inspection, shipping, receiving, recall, among others. Workflows may also include other workflows. For example, a manufacturing workflow may include environmental workflows, sensor data monitoring workflows, compliance workflows, auditing workflows, and statistical workflows, such as inventory, average time in a stage, and the like. Thus, a workflow may be defined as a set of tasks associated with generating, implementing, producing, or distributing a product.

The dual deterrent IIO is a feature or mark carrying information that may be useful for tracing, tracking, state indication, data embedding, authentication, identification, or any other operations that may be used to provide information as a product progresses through the stages of a workflow. As used herein, all of these operations are encompassed by the general term "confirming." For example, confirming may include determining that the information in the IIO is consistent with the associated mark. The dual deterrent IIO can maintain a size, a shape, or both, as the item moves through the workflow, even though additional information may be added at each stage of the workflow. The dual deterrent IIO may be designed taking into account security needs, the type of readers available, and other concerns, such as branding, fraud prevention, robustness to damage, and the like.

The dual deterrent IIO may be a glyph or mark that can be incrementally over-written throughout the workflow to form an identifying object having increasing data content at each stage. For example, the dual deterrent IIO may include a binary barcode, in which the state of each tile in a field of tiles in a two dimensional matrix encodes a bit in a bitstream. The dual deterrent IIO may also include three dimensional (3D) grayscale barcode, in which a field of tiles in a two dimensional matrix encode information and a grayscale state is used to encode a third dimension at each tile. As another example, the dual deterrent IIO may include a 3D color barcode, in which a field of tiles in a two dimensional matrix encode information and a color state is used to encode a third dimension, e.g., multiple bits, at each tile. Thus, the dual deterrent IIO may be considered a set or family of such barcodes, since the IIO portion includes all of the states from the beginning to the end of the workflow.

Each state of the tiles may be readily distinguished from each other state. As discussed below, the states may include a black or white state, a number of grayscale intensities, from completely white to completely black, or a color. The tiles may include square shaped tiles, rectangular shaped tiles, triangle shaped tiles, rounded tiles, mixed shaped tiles, mixed sized tiles, non-uniformly shaped tiles, or combinations thereof. Each state of the dual deterrent IIO is determined by the set of tiles that have been written to at a given stage of the workflow.

The dual deterrent IIO may be a physical mark on a product, such as a printed document or a label on a package. Further, the dual deterrent IIO may be an electronic object in a document, for example, which is displayed as a mark on a viewing device. In this embodiment, the dual deterrent IIO may be printed with the product and can appear as a mark on a first page of a document.

The dual deterrent IIO may be read from either the physical object or from the viewing device using any image capture device, such as specialized handheld or mobile device, or a bar code reader. In some embodiments, a virtual bar code reader may be used to read the dual deterrent IIO from an electronic document, without using a physical device. In some embodiments, a software object may locate and extract the image from an electronic document. As used herein, the term "bar code reader" includes all of these devices or techniques.

FIG. 1 is a schematic diagram of a system 100 for using a dual deterrent IIO through a workflow in accordance with an embodiment. The workflow may start at a first stage system 102. Any number of systems for stages in the workflow may be included, depending on the workflow.

The first stage system 102 may access an identifying object registry 104, for example, over a network 106, to obtain an initial code for the dual deterrent IIO. The network 106 may be a local area network (LAN), a wide area network (WAN), or the Internet, and may include both public and private network segments, such as virtual private networks (VPN). Other information may also be provided, such as a relationship between the IIO and an associated mark, or a stream of bits that may be used to set initial entropy in the dual deterrent IIO, as discussed in further detail below.

The first stage system 102 can be used to create the dual deterrent IIO, for example, by writing a number of entropy bits to the dual deterrent IIO, followed by writing a bitstream generated from the initial code provided by the identifying object registry 104. The first stage system 102 can then create the associated mark, which will generally be proximate to the IIO.

As discussed herein, entropy bits are bits set in an IIO to provide an initial complexity, or entropy, that may make the code written onto the IIO harder to guess. The bitstream may be generated using any number of techniques. In an embodiment, a private key associated with the initiator of the first stage of the workflow may be used to encrypt the initial code provided by the identifying object registry 104. More generally, a nonce can be used for initialization of the IIO to prevent known-plaintext attacks on the private key. As used herein, a nonce is a random or semi-random number issued during an authentication protocol to help prevent replay attacks based on prior communications. Public key hashing or other nonces could then be used for the subsequent workflow stages. Any number of other techniques to generate the bitstream may be used in various embodiments. In an embodiment, the initial code provided by the identifying object registry 104 may used as the bitstream and may be directly written to the dual deterrent IIO, for example, if all confirmation is performed against the identifying object registry 104. The associated mark may be generated using various techniques and relationships, as discussed herein.

Other stages of the workflow may have associated systems, such as the stage two system 108 and the stage three system 110 illustrated in FIG. 1. The first stage system 102 may be used to either coordinate the physical transfer of a product to the second stage system 108 or to directly transfer a product in electronic form. Similarly, the stage two system 108 may transfer or coordinate the transfer of the product to the stage three system 110. At each stage, information may be sent to the next stage's system to confirm the dual deterrent IIO, for example, comparing the associated mark to the information in the IIO, among others. In an embodiment, the system at each stage will confirm the dual deterrent IIO by communicating with the identifying object registry 104.

Any of the stage systems 102, 108, and 110, or the identifying object registry 104, may include units to provide the functionality used to generate the dual deterrent IIO, as shown for the first stage system 102. These units may include a central processing unit (CPU) 112. The CPU 112 may include a single core processor, a multi-core processor, or a cluster of processors, for example, in a cloud computing configuration. The CPU 112 may communicate with other units over a bus 114, which can include a PCI bus, a PCIe bus, an optical bus, or any other suitable type of bus.

A memory 116, such as random access memory (RAM) or read-only memory (ROM), may be used to store operating programs and data configured to implement the methods described herein. As used herein, programs include machine readable code configured to direct a processor to implement various functions. Similarly, a storage system 118 may provide longer term storage for data and programs. The storage system 118 may include, for example, a hard drive, an optical drive, a flash drive, a memory drive, and the like. The memory 116 and storage system 118 provides a non-transitory, computer readable medium for storing programs and data to implement the techniques described herein, as discussed further with respect to FIG. 10.

Other units may also be included to provide further functionality. For example, the stage systems may include a display driver 120 to drive a display 122, to display the product and the dual deterrent IIO. A human-machine interface (HMI) 124 can be used to interface with a number of input devices, such as a pointing device 126, such as a mouse or touch-screen, among others, a keyboard 128, and a barcode reader 130. A printer driver 132 may be used to interface with a printer 134 to print the dual deterrent IIO, the product, or both. The printer 134 may be a general purpose unit, such as a laser printer or an ink jet printer, or may be a dedicated unit configured to overprint a dual deterrent IIO with additional information. In addition, a network interface card (NIC) 136 may be provided to permit the stage systems to access the network, the NIC 136 may include a wired Ethernet interface, a wireless network interface, or a mobile network interface.

A number of possible workflow patterns may be implemented on the system 100 discussed above. For example, the workflow may follow the patterns discussed with respect to FIGS. 2 and 3.

Figure 2:
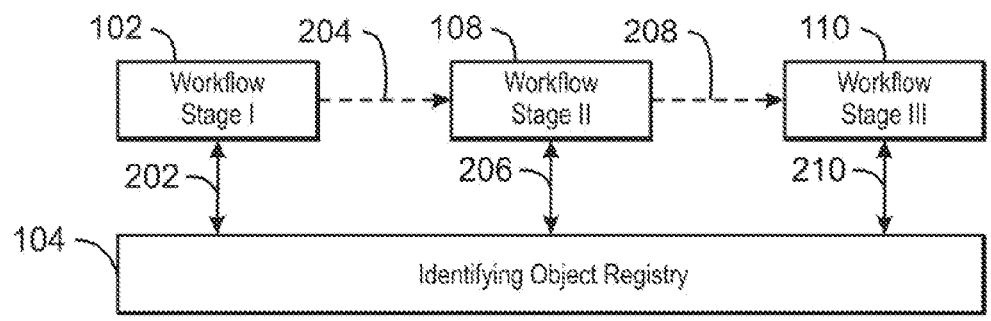
FIG. 2 is block diagram of a workflow using a centralized identifying object registry for confirmation of a product in accordance with an embodiment.

FIG. 2 is block diagram of a workflow using a centralized identifying object registry 104 for confirmation of a product in accordance with an embodiment. If the registry-based workflow 200 is utilized, a first stage system 102 exchanges the information to generate the dual deterrent IIO with the identifying object registry 104, as indicated by arrow 202. The information 202 may include the rules for generating the dual deterrent IIO, rules relating the IIO to the associated marks, any bits used for adding complexity (e.g., entropy) to the initial dual deterrent IIO, and the like. In an embodiment, the information 202 may be the total information needed to write the dual deterrent IIO, for example, the identifying object registry 104 were to retain all coding information.

At the next stage in the workflow, the second stage system 108 receives a package 204 of information from the first stage system 102. The information 202 may include the document and its associated dual deterrent IIO. In the case of a physical product, the package 204 may be physically transferred from one stage to the next in the workflow. The second stage system 108 may then confirm the dual deterrent IIO, for example, by decoding the image to form a bitstream and then exchanging information 206, including the bitstream, with the identifying object registry 104 for confirmation of the information 206. The information from the associated mark may be sent as part of the information 206, for use by the identifying object registry 104, or may be used in a previous step to confirm the dual deterrent IIO prior to sending the information 106 to the identifying object registry 104. The information 206 returned from the identifying object registry 104 may include information confirming the dual deterrent IIO and information for generating a dual deterrent IIO for the next stage of the workflow. In an embodiment, the information 206 from the identifying object registry 104 may include all of the information used to directly complete the dual deterrent IIO.

To advance the workflow, the second stage system 108 sends a package 208 of information on to the third stage system 110. The third stage system 110 can then confirm the dual deterrent IIO by decoding the image to form a bitstream, and exchanging information 210 with the identifying object registry 104 for confirmation of the dual deterrent IIO. As described for the first, stage of the workflow, information from the associated mark may be sent with the code to the identifying object registry 104, or may be used to confirm the dual deterrent IIO prior to sending the information 210 to the identifying object registry 104.

The techniques are not limited to only three workflow stages, but may include any number of workflow stages, both in series and in parallel. In the embodiment shown in FIG. 2, the addition to the dual deterrent IIO at each stage in the workflow 200 can be performed in conjunction with the identifying object registry 104. However, an independent incremental workflow may be utilized, without backward visibility in the workflow stage-stage transmission, as discussed further with respect to FIG. 3.

Figure 3:
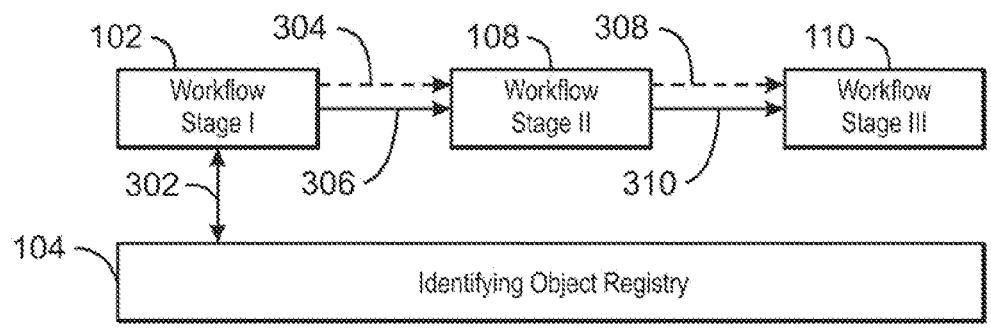
FIG. 3 is block diagram of a workflow that obtains an initial code from an identifying object registry, and uses the systems at each stage of the workflow for confirmation of the product in accordance with an embodiment.

FIG. 3 is block diagram of a workflow 300 that obtains an initial code from the identifying object registry 104, and uses the systems at each stage of the workflow to confirm the product in accordance with an embodiment. In this embodiment, the first stage system 102 exchanges information 302 with the identifying object registry 104 to create the dual deterrent IIO. As described with respect to FIG. 2, the information 302 may include the rules for generating the dual deterrent IIO, rules relating the associated mark to the IIO, any bits used for adding entropy to the initial dual deterrent IIO, and the like. In addition, the information 302 may include rules for creating a dual deterrent IIO at each stage of the workflow 300. In some embodiments, these rules may include creating a hash code of the bitstream decoded from the current object, using a private key to encrypt the hash code, writing a bitstream of the hash code over the current dual deterrent IIO, and sending the hash code on to the next work stage along with a public key for decryption. Other information may also be included, such as an encrypted version of the starting point. The information 302 may also include rules for creating the associated mark, such as rules for incrementally filling in the associated mark to reflect the information content of the IIO, among others.

The dual deterrent IIO at each stage of the workflow can be deduced when the starting point is known, as most workflows have a small and well-defined set of stages. Workflow exceptions may occur, however, when extra steps have been added, for example, in a non-legitimate progression. Similarly, exceptions may occur when available space for over writing successive codes becomes sparse during the workflow. In such instances, the stage of the workflow may not be deduced, and the dual deterrent IIO may fail the confirmation process. Further, the associated mark may not be consistent with the IIO, indicating a potential attempt at fraud, among other problems, leading to a failure in the confirmation process. Any number of other techniques may be used to create a dual deterrent IIO at each stage of the workflow 300.

At the next stage, the stage two system 108 receives the product 304 and the information 306 that may be used to confirm the dual deterrent IIO on the product. For example, the information 306 may include an intelligent hash of the previous state of the dual deterrent IIO from the first stage system 102, among other items, such as the rules used to create the associated mark. In this embodiment, the stage systems may not have access to the identifying object registry 104, and the addition to the dual deterrent IIO at each stage in the workflow will be performed in conjunction with initial instructions received from the identifying object registry 104. This embodiment may be useful, for example, when the distribution network organization is proprietary.

After the work at stage two is completed, the stage two system 108 may forward the product 308 including the dual deterrent IIO, to the stage three system 110, along with the information 310 needed to confirm that earlier added information is correct.

As described herein, the identifying object registry 104 can include hardware, such as processors, memory, and storage. Further, the identifying object registry 104 and each of the workflow stage systems 102, 108, and 110, may include software for generating an incrementally completed dual deterrent IIO. Access to the identifying object registry 104 may be secure, for example, requiring a login and password or other authorization methods, such as biometric validation of identity, possession of a secure token, and the like. In an embodiment, the identifying object registry 104 may be unsecure, e.g., being publicly accessible.

In some embodiments, the system 100 may be set up as a cloud computing network, which may be a virtualized bank of computers including servers that enable Internet-based computing. Shared resources, software, and information may be provided to various computing devices through the cloud computing network. The computing devices may include the workflow stage systems 102, 108, or 110, which may be stationary, such as desktop computers, or mobile, such as laptop computers, netbooks, cellular phones, personal digital assistants (PDAs), and the like. The cloud computing network may allow a registry system provider to deliver access to the identifying object registry 104 and its various services to subscribers online via another web service or software, such as a web browser. Software and data associated with the cloud computing network may be stored on servers and their associated memory.

Thus, as a result of the workflow described above, the dual deterrent IIO contains an incrementally increasing amount of information at each stage of the workflow. This is discussed with respect to FIG. 4.

Figure 4:
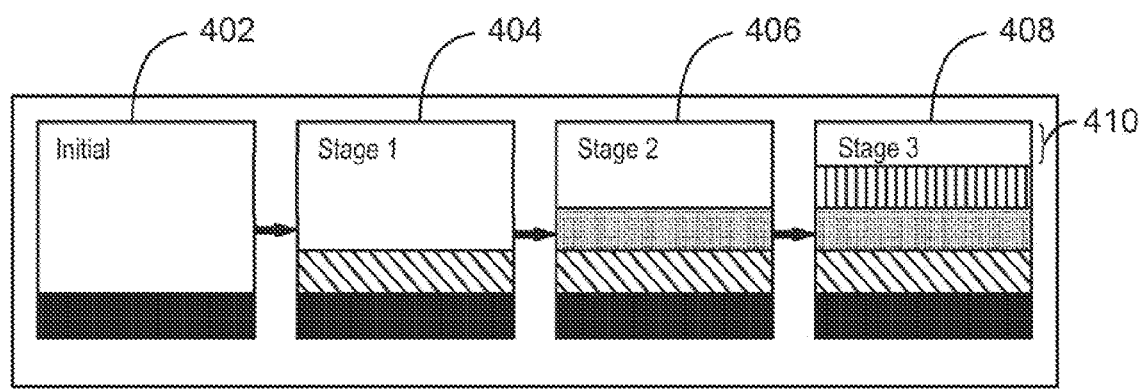
FIG. 4 is a schematic of information content in an IIO at different stages of a workflow, in accordance with an embodiment.

FIG. 4 is a schematic 400 of information content in a dual deterrent IIO at different stages of a workflow, in accordance with an embodiment. The dual deterrent IIO can have an initial number of bits set to provide entropy, making it less probable that the code may be guessed. These entropy bits along with a first amount of information in an associated mark provide a first amount 402 of information in the grayscale object. At the completion of the first stage of the workflow at block 404, the dual deterrent IIO is overwritten and contains a second and increased amount of information in the IIO and the associated mark, which is transferred to the second stage of the workflow. After completion of the second stage of the workflow, at block 406, the dual deterrent IIO has a third and further increased amount of information. At block 408, the third stage of the workflow is completed, and the dual deterrent IIO contains a fourth amount of information. A portion 410 of the bits that may be written are left blank, providing entropy for the final dual deterrent IIO. As discussed with respect to FIG. 8, the associated mark may show the amount of data contained in the IIO, among other information. To see the advantages provided by a three-dimensional IIO, it is useful to examine a simple two-dimensional IIO, as discussed with respect to FIG. 5.

Two-Dimensional (2D) IIOs

Figure 5:
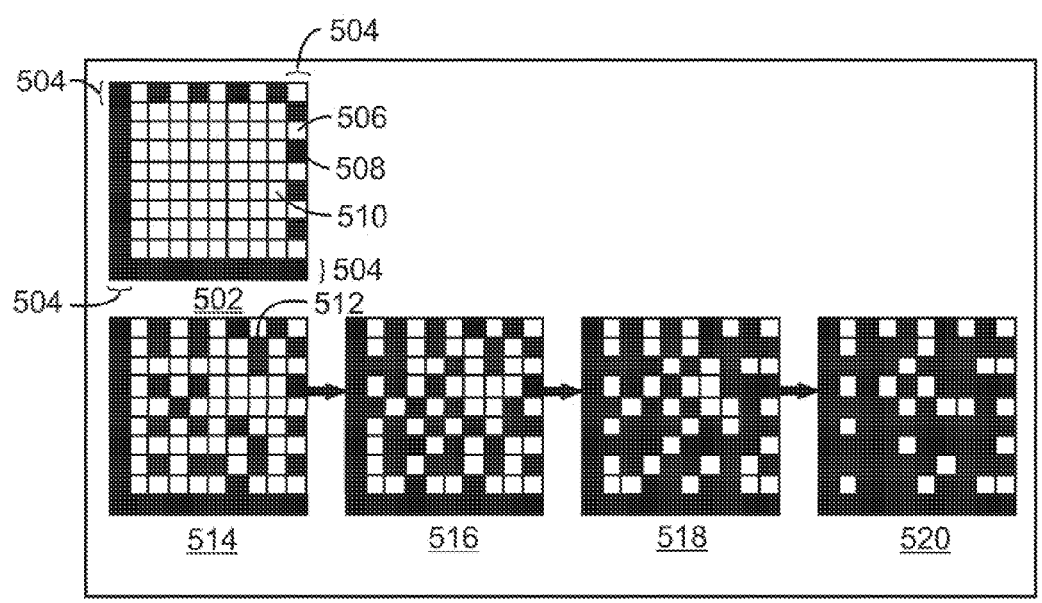
FIG. 5 is a schematic showing an example of changes to tiles that may occur in a two-dimensional IIO at each stage in a workflow.

FIG. 5 is a schematic 500 showing an example of changes to tiles that may occur in a two-dimensional (2D) IIO at each stage in a workflow. A blank IIO 502 shows the presence of non-payload indicia (NPI), which can be used to convey basic identification and calibration information, including such information as the type of IIO being used, the number of gray values or color values that may be present, an arrangement for the gray values, and the like. In this example, the NPI include the perimeter tiles 504 on all four sides of the 2D IIO. The alternating light tiles 506 and dark tiles 508 along two edges of the perimeter, and the dark tiles placed along the other two sides, provide calibration marks for adjustment of the image, as described herein. The blank tiles 510 inside the 2D IIO are the payload tiles which may be changed from light to dark to indicate the presence of a bit value of one.

A number of entropy bits 512, for example, sixteen in this illustration, may be set to a value of one within the blank 2D IIO 502 to create an initial 2D IIO 514. The entropy bits 512 increase the complexity of the initial 2D IIO 514, making it less probable that a code may be guessed. The initial 2D IIO 514 is passed to the first stage of the workflow, which writes the first bitstream over the initial 2D IIO 512, providing a first stage 2D IIO 516. An associated mark may also be created at this stage, for example, representing the amount of data stored in the 2D IIO 516, among other information.

The writing may be performed by any number of schemes. For example, the writing may be performed by initializing both a tile counter and a bit pointer to zero. The value of the first bit in the stream is compared to the value of the first tile. If the first tile is light (zero) and the first bit is one, the value of the first tile is changed to dark (one), and both counters are incremented. If the first tile is dark (one), and the first bit is one, the tile counter is incremented until a light tile is reached, at which point the value of the tile is changed to dark (one). At that point, both counters are incremented. If the first bit is zero, the tile counter and the bit counter are both incremented without changes to tiles. The process is repeated until all of the bitstream is used. If the tiles are completely examined, i.e., the tile counter exceeds the number of tiles, the tile counter is reset to zero, and the process continues until all bits are written.

The first stage 2D IIO 516 is then passed to a second stage of a workflow with the product. At the second stage of the workflow, the first stage 2D IIO 516 may be confirmed, for example, by using an associated mark, sending a code to the identifying object registry 104, or both. After confirmation, the code may be used in the creation of a second stage 2D IIO 518, for example, by writing a bitstream over the first stage 2D IIO 516. The process is repeated at the third stage resulting in the third stage 2D IIO 520.

A 2D IIO using light to dark binary transitions may provide a large number of state transitions, making the probability of decoding or falsification very low. For example, the statistical probability associated with a stage i in the workflow may be defined as $P_i$. Thus, the number of residual (0 bits) at the end of the workflow is $N_{RB}$, and the number of initial unwritten bits is $N_{IU}$. The values of $N_{RB}$ and $N_{IU}$ used to achieve a particular value for $P_i$ are governed by the formula of Eqn. 1.

$$\frac{N_{IU}!}{(N_{IU} - N_{RB})! N_{RB}!} \geq \prod_i P_i \qquad \text{Eqn. 1}$$

In Eqn. 1, the exclamation mark (!) represents the factorial operator. $P_i$ may be determined from the required statistical confidence that a next step cannot be randomly guessed multiplied by the total number of IIOs of the current state that will be readable in the supply chain, among others. If the IIO is unique at step i−1, then the total number of IIOs of the current state is 1.

As an example, consider a case in which a 2D IIO is initially 25% filled with black tiles and upon completion of its workflow it is 75% filled with black tiles. For purposes of this example, it can be assumed that there are six stages in the workflow: a manufacturer, four distributors, and an end retailer. Further, for the purposes of the supply chain, it can be assumed that the desired statistical $P_i$ values are $10^9$ for manufacturer and the four distributors and $10^3$ for the retailer. Thus, the $$\prod_i P_i$$

value is about $10^{48}$.

Suppose a number of bits in each of a number of bitstreams are represented by {g,h,i,j,k,l}, wherein each of the bitstreams are used to move the product through a particular stage of the workflow. The final number of bits, $N_{RB}$, is assumed to be ⅓ of the original unwritten bits, $N_{IU}$. Accordingly, the governing equations for each step in this workflow are:

$$\frac{N_{IU}!}{g!(N_{IU}-g)!} \geq 10^9 \qquad \text{Eqn. 2}$$

$$\frac{(N_{IU}-g)!}{h!(N_{IU}-g-h)!} \geq 10^9 \qquad \text{Eqn. 3}$$

$$\frac{(N_{IU}-g-h)!}{i!(N_{IU}-g-h-i)!} \geq 10^9 \qquad \text{Eqn. 4}$$

$$\frac{(N_{IU}-g-h-i)!}{j!(N_{IU}-g-h-i-j)!} \geq 10^9 \qquad \text{Eqn. 5}$$

$$\frac{(N_{IU}-g-h-i-j)!}{k!(N_{IU}-g-h-i-j-k)!} \geq 10^9 \qquad \text{Eqn. 6}$$

$$\frac{(N_{IU}-g-h-i-j-k)!}{l!(N_{IU}-g-h-i-j-k-l)!} \geq 10^3 \qquad \text{Eqn. 7}$$

Note that $(N_{IU}-g-h-i-j-k-l)!$ in Eqn. 7 is the same as $N_{RB}!$, and so simplifying Equations 2-7 together gives Eqn. 8.

$$\frac{N_{IU}!}{g!h!i!j!k!l!N_{RB}!} \geq 10^{48} \qquad \text{Eqn. 8}$$

Eqn. 8 is in similar form to Eqn. 1. With Eqn. 8, we can compute the overall number of bits required in the 2D barcode (and by extension at each step in the workflow).

Assuming g!=h!=i!=j!=k!, the equation simplifies to:

$$\frac{N_{IU}!}{(g!)^5 l! N_{RB}!} \geq 10^{48} \qquad \text{Eqn. 9}$$

Even with governing Eqns. (2)-(9), there are still a large set of solutions to this problem. It can be assumed that g≤h≤i≤j≤k, since they represent the number of open bits to achieve a given number of bits at a particular stage. Further, k>>l in this particular example. However, it can be determined from above that with N payload elements (bits), there are $2^N$ different states of the overall payload, and, so, the minimum number for N is such that $2^N \geq 10^{48}$ or more and, thus, N≥160. Because barcodes are generally represented as N×N where N is an even number, N=14 has been selected for this example, in other words, giving a tile area of 14×14 for the information payload, i.e., not including tiles used for NPI. This provides $2^{192}=6.277\times10^{57}$ states, which is sufficient to accommodate the state changes {g,h,i,j,k} above, but not enough to accommodate the initial fill and final fill tiles, for example, used for the entropy bits. Thus, a 2D security code may be selected with a 16×16 matrix of 256 tiles. In this state, 32 tiles may be filled as the starting condition and 224 filled as the final fill. This means there are 192 bits to fill in between, with an additional statistical advantage of having 224 to choose from on the first step {g}.

To match the desired probabilities, the steps {g,h,i,j,k} may be given 36 bits each, with {l} as 12 as an initial guess for the last step. Thus, for the last step, {l}, 44 remaining open tiles can move to 32 open tiles, and so the governing statistics are $44!/12!32!=2.1\times10^{10}$, which is well above the required $10^3$. For {k}, the governing statistics are $80!/36!44!=7.2\times10^{22}$, which is well above the required $10^9$. For {g,h,i,j}, the statistics are even better—for {j} it is $116!/36!80!=1.27\times10^{30}$, for {i} it is $1.0\times10^{35}$, for {h} it is $5.5\times10^{38}$, and for {g} it is $5.5\times10^{41}$. This demonstrates that the number of state transitions is much higher than the number of states. In this case, Eqn. 10 applies.

$$\frac{N_{IU}!}{(g!)^5 l! N_{RB}!} = 6.23 \times 10^{178} \qquad \text{Eqn. 10}$$

A smaller 2D IIO may also be used. For example, if the 2D IIO is limited to a 12×12 matrix of payload tiles, $N_{IU}$ may be selected as 136, so there are $3.76\times10^{12}$ initial states using 8 bits to define the initial state, and $2.09\times10^{13}$ final states using 16 bits to define the final state. The remaining 120 bits for {g,h,i,j,k,l} use {22,22,22,22,22,10} bits each, providing $1.28\times10^{25}$, $1.8\times10^{23}$, $9.2\times10^{20}$, $8.6\times10^{17}$, $2.74\times10^{13}$ and $5.1\times10^6$ state transitions, respectively. So, here, for this smaller 2D IIO Eqn. 11 applies.

$$\frac{N_{IU}!}{(g!)^5 l! N_{RB}!} = 2.69 \times 10^{107} \qquad \text{Eqn. 11}$$

Another way to obtain a smaller IIO is to encode multiple bits into each tile. In an embodiment, this is performed by using multiple levels of darkness or multiple colors to represent levels in a single tile, increasing the number of bits each tile represents. This is further discussed with respect to FIG. 6.

The associated mark may also allow for a smaller IIO, since the confirmation may be strengthened by the additional information provided by the associated mark. This is discussed further with regards to FIGS. 8 and 9.

Figure 6:
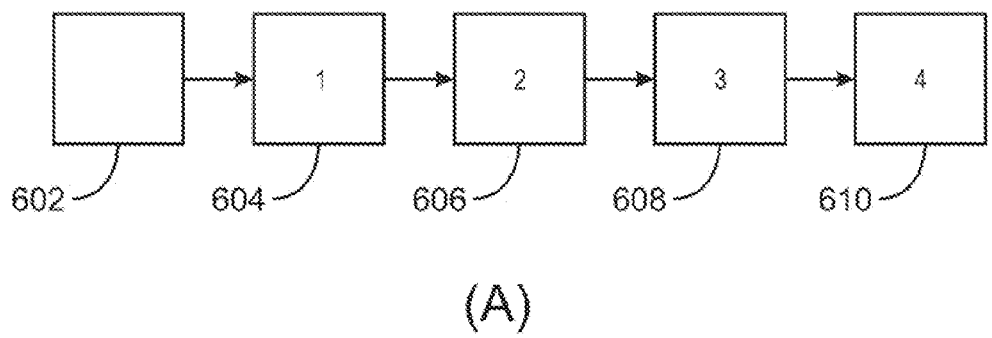
FIG. 6 is a schematic illustrating the use of a multi-level gray or color scale to increase the information content of a single tile, in accordance with an embodiment.
Figure 6:
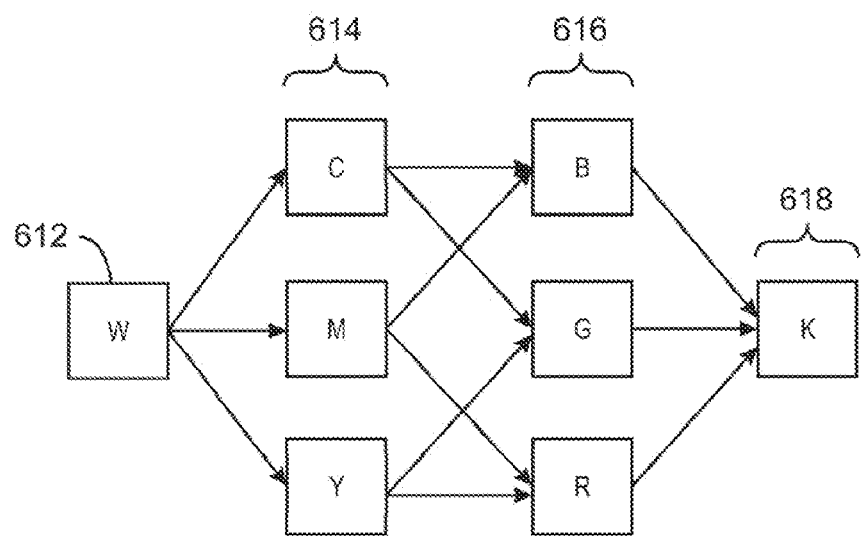

FIG. 6 is a schematic 600 illustrating the use of a multi-level gray or color scale to increase the information content of a single tile 602 or 612, in accordance with an embodiment. In FIG. 6(A), each time a bit value of one is written to the tile, the grayscale intensity may be increased by 25%, for example, going from white to 25% gray at the first bit, as indicated by the second tile "1" 604. Another bit value of one may increment the intensity to 50% gray for the second bit in a third tile "2" 606, to 75% gray for the third bit in a third tile "3" 608, to 100% gray, i.e., black, for the fourth bit in a fourth tile "4" 610.

The use of the grayscale changes the IIO to a three dimensional IIO. It can be noted that the grayscale values are not limited to 4 intensity levels, as any number of intensity levels may be used, so long as they can be clearly distinguished. In general, N possible states for a single tile may store Log(N)/Log(2) bits in that tile. Thus, the use of four intensity levels in addition to a white base level increases the information density of the dual deterrent IIO by 2.3 in comparison to the 2D IIO discussed with respect to FIG. 5.

A similar increase in information content may be realized by using a color scale, as shown in FIG. 6(B). In this example, a white tile may encode a bit value by being changed to any one of a first set 614 of colored tiles, e.g., a cyan tile "C", a magenta tile "M", or a yellow tile "Y". The colors for the first set 614 of tiles may be adjusted to reach more complex colors in a second set 616, for example, by overlaying a tile in the first set 614 with different tones or hues. Thus, a C colored tiled in the first set 614 may be adjusted to be either a blue "B" tile or a green "G" tile in the second set 616. Similarly, an M colored tile may be adjusted to be either a B colored tile or a red "R" colored tile in the second set and a Y colored tile may be adjusted to be either a G colored tile or an R colored tile. Further, each of the tiles in the second set 616 may be adjusted by the addition of a final tone or hue to be a black "K" colored tile.

As for the grayscale tiles, the use of the colored tiles changes the IIO to a three dimensional IIO. Although eight colors are shown, any number of colors may be used, so long as they may be clearly distinguished by the imaging device. As the eight different colors may encode eight bits, the information density of the IIO increases by a factor of Log(8)/Log(2)=3 in comparison to the 2D IIO discussed with respect to FIG. 5.

Figure 7:
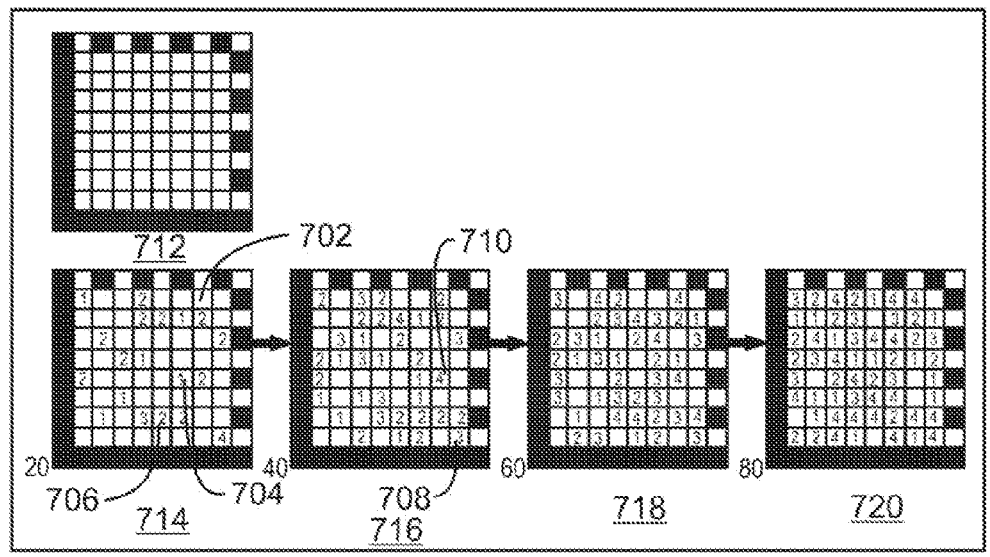
FIG. 7 is a schematic showing an example of changes to tiles that may be seen in combining the two-dimensional IIO, as shown in FIG. 6, with a multi-level gray or color scale for each tile, in accordance with an embodiment.

FIG. 7 is a schematic 700 showing an example of changes to tiles that may be seen in combining the two-dimensional IIO, as shown in FIG. 5, with a multi-level gray scale for each tile, as shown in FIG. 6(A), in accordance with an embodiment. Throughout FIGS. 7 and 8, tiles with no number 702 are white tiles, tiles bearing a "1" 704 are at 25% intensity, tiles bearing a "2" 706 are at 50% intensity, tiles bearing a "3" 708 are at 75% intensity, and tiles bearing a "4" 710 are at 100% intensity, i.e., are black. The numbers also correspond to the number of bits, having a bit value of one, which have been written to a tile. Similar changes are seen when using the color scale of FIG. 6(B).

In this example, the blank IIO 712 may have 20% of the available storage space overwritten with entropy bits, forming the initial IIO 714. During the first stage of the workflow, the initial IIO 714 may be overwritten with a bitstream taking another 20% of the available storage space in the resulting first IIO 716, which is 40% full. Similar changes in the available storage space may occur after the second stage of the workflow, resulting in a second IIO 718 that is 60% full, and after the third stage, resulting a third IIO 720 that is with 80% full. The remaining 20% may be left blank to provide entropy to the third IIO 720.

The amounts used herein at each stage of the workflow are merely examples, as any percent completion may be used, such as calculated for the two-dimensional IIO discussed with respect to FIG. 5. Further, it may be accommodated to have an IIO where the step to step statistics are substantially evenly matched so that the security levels are as identical as feasible throughout the workflow. An associated mark may be printed or displayed in proximity to the IIO indicating the proportion of available storage that have been written in the IIO, as discussed with respect to FIG. 8.

Figure 8:
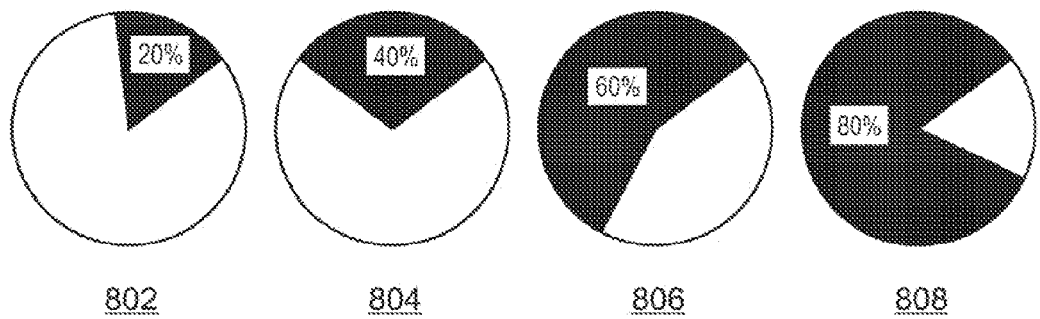
FIG. 8 is a drawing of an associated mark that may be incrementally completed to indicate workflow progress.

FIG. 8 is a series of drawings 800 showing the incremental completion of a associated mark to indicate workflow progress, such as the progression shown in FIG. 7. The first associated mark 802 indicates that 20% of the available information storage in the IIO has been written, and may be used in proximity to an initial IIO 714 (FIG. 7). The second, associated mark 804 may be in proximity to the first IIO 716, and may be overwritten when the first IIO 716 is overwritten to indicate that the amount of information in the IIO is at the 40% level. Similar associated marks 806 and 808 may be used to indicate when the information is at the 60% level and the 80% level. These may be overwritten marks in the proximity of the second IIO 718 and the third IIO 720.

The associated marks may be used to confirm an IIO, for example, by comparing the associated mark to the amount of information that should be present in an IIO. If an IIO has been manually altered, the information content may no longer agree with the associated mark and the confirmation will fail. Further, the amount of information written at each stage of the workflow will not be general knowledge, making accurate modification of the associated mark difficult, even if the purpose is guessed. The associated mark is not limited to showing the amount of completion of an IIO. Any number of other relationships between the information IIO and the associated mark may exist, as discussed with respect to FIG. 9. In some embodiments, the information in the associated mark is independent of the information in the IIO.

Figure 9:
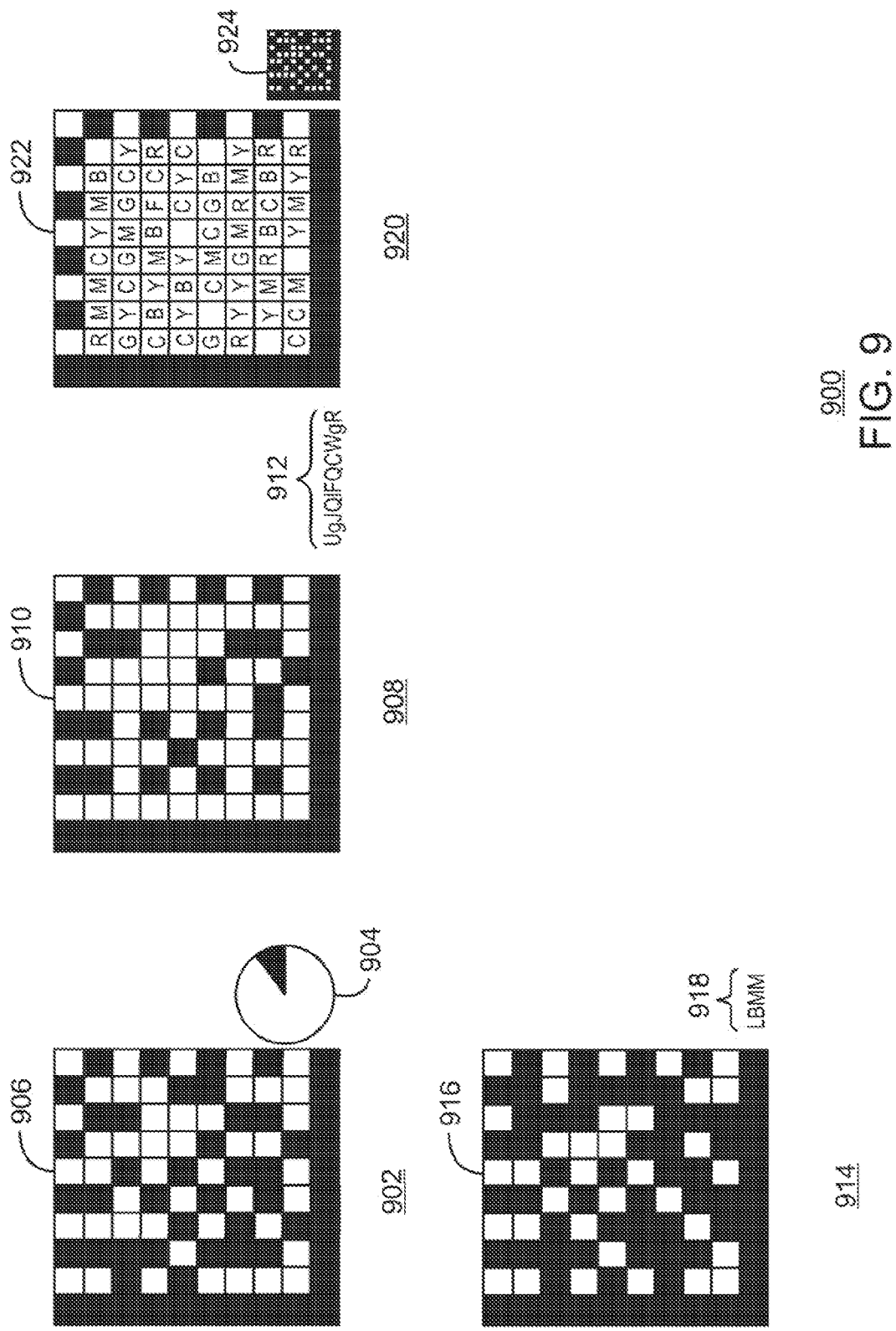
FIG. 9 is a drawing of three IIOs with associated marks that may be used to determine workflow progress, confirm the code, or provide further information in accordance with an embodiment.

FIG. 9 is a drawing 900 of three examples of dual deterrent IIOs with associated marks that may be used to determine workflow progress, confirm the code, or provide further information in accordance with an embodiment. In these examples, the first two dual deterrent IIOs are two dimensional, i.e., each tile has two states and encodes a single bit.

The first dual deterrent IIO 902 demonstrates the use of a progression mark 904 as the associated mark, showing the information content of the IIO 906, as discussed with respect to FIG. 8. As the IIO 906 is overwritten with more information, the progression mark 904 is overwritten to reflect the amount of storage space that is occupied. Other relationships between the data in the IIO and the data in the associated mark include, for example, replication, scrambling, bit or parity check, compression, signing, and encrypting, among others.

The second dual deterrent IIO 908 illustrates a mark-specific replication of the data in the IIO 910 in a microtext mark 912. This may be performed by creating a text version of the code in the IIO 918. As an example, if the associated binary representation of the information in the IIO 910 were in HEX (hexadecimal), then the IIO 910 would be accompanied by the text 5202502054025A04. If it were represented as ASCII, then 52 02 50 20 54 02 5A 04 (HEX) would be instead ASCII 82 2 80 32 84 2 90 4, or in character form, R[SOT]P[Space]T[SOT]Z[EOT] where [SOT]=start of text, [Space]=space key, and [EOT]=end of transmission. Since ASCII translation involves so many special characters, in embodiments, a 64 character modified alphanumeric set may be used, such as {ABCDEFGHIJKLMNOPQRSTUVW XYZ abcdefghijklmnopqrstuvwxyz0123456789~#}, where A={000000}, B={000001}, C={000010}, etc. The character map may be wrapped around when exceeded. Thus, the IIO 910 may be written as {010100}, {100000}, {001001}, {010000}, {001000}, {000101}, {010000}, {000010}, {010110}, {100000} and {010001}, wherein the last two "01" are due to wrap-around, since 64 is not an even multiple of 6, in other words, the first two bits may be reused. In the encoding scheme shown above, these 11 6-bit groups encode {U}, {g}, {J}, {Q}, {I}, {F}, {Q}, {C}, {W}, {g}, and {R}, as shown in the microtext mark 912.

Any number of other techniques may also be used. In an embodiment, the second mark may be a scrambled version of the first mark. This can be relatively easily "reverse engineered" from a large set of dual deterrent IIOs, but offers the advantage of being easy to convey to an agent in the field, e.g., a typical rule may be that "the second mark always juxtaposes the third and fourth rows and the 9th and 16th fields."

The associated mark may be a parity or bit check version of the IIO. This is related to replication, but here the data to perform parity checking of the first mark can be used, either alone or in some combination (even sampling) of the data in the original. For the third dual deterrent IIO 914, it can be assumed that a parity bit goes by row (8) and column (8) of data bits, and that an even parity is used, i.e., that the sum of 1's in the row or column+the parity bit are an even number, is deployed. For example, the columns in IIO 916 may then yield 10110001 and the rows (top to bottom) yield 11001100. These sequences may be incorporated into HEX, ASCII, alphanumeric code, etc., as described for IIO 912. The alphanumeric code may then be used to create a microtext mark 918. For example, if four bit sequences were selected from the columns and then the rows, this might yield the microtext mark 918 shown in proximity to the IIO 916 in the dual deterrent IIO 914. Any number of different combinations of bits may be used to select the characters of the microtext mark 918. Further, a similar mapping may be used to generate other associated marks that do not use microtext.

Another example of an associated mark is shown by the fourth dual deterrent IIO 920. In this example, a three dimensional IIO 922, based on the colors discussed with respect to FIG. 6, is shown adjacent to a second smaller IIO, which is used as the associated mark 924. In this case, the associated mark 924 may a simplified version of the IIO 922, or may be an encrypted or compressed version. For example, both the IIO 922 and the associated mark 924 may be encrypted from a common source, such as a two part nonce, a single stream and its scrambled form, a single stream and its signed form, and the like. Further, the associated mark 920 may be a digitally signed version of the IIO 922.

The techniques are not limited to those discussed above. Any number of other techniques may be used to relate the information in an IIO to the information in an associated mark to create a dual deterrent IIO. Further, as mentioned herein, the information in the associated mark may be independent of the information in the IIO.

Figure 10:
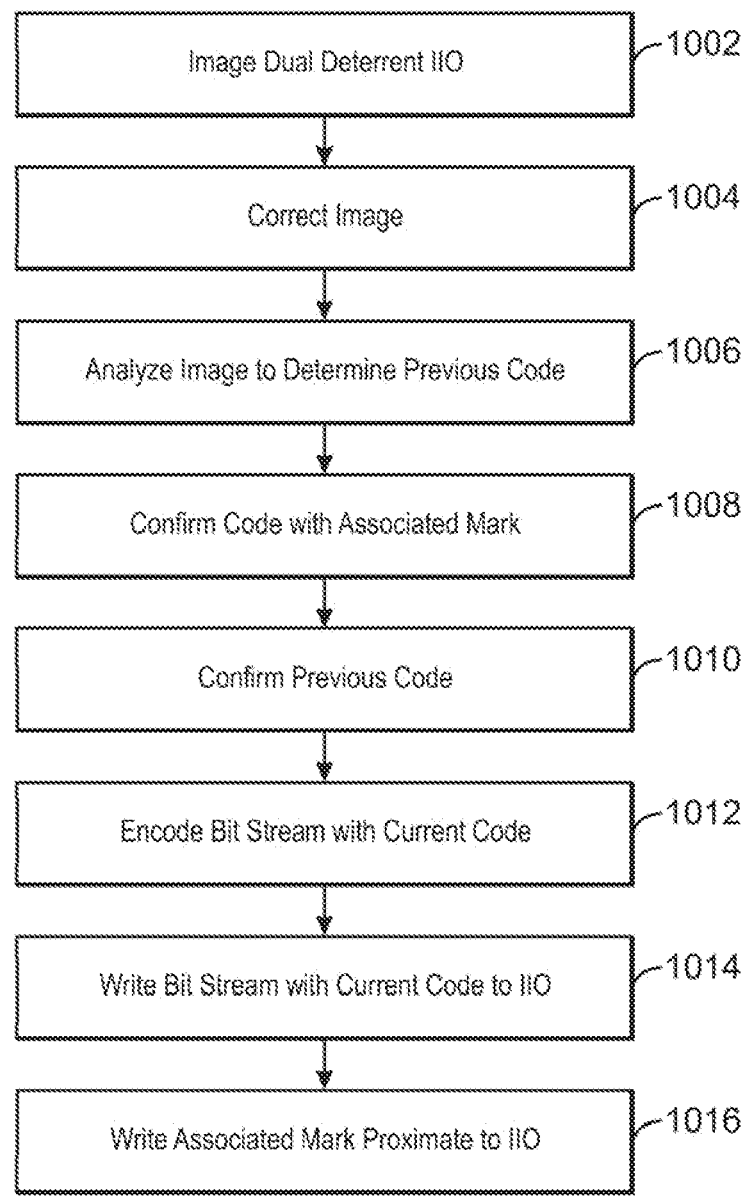
FIG. 10 is a process flow diagram of a method for generating an IIO having an associated marks, in accordance with an embodiment.

FIG. 10 is a flow diagram of a method for generating an IIO in accordance with an embodiment. Referring also to FIG. 1 prior to configuring the system 100 and its various components to generate a dual deterrent IIO, the stages of the workflow can be set and a number of bits to write in total and during each state of the workflow can be selected. In some instances, however, the number of bits may be dynamically determined at any stage in the workflow. For example, if additional bits need to be added for security at a stage of the workflow that takes place outside of a secure environment. In one embodiment, a dual deterrent IIO may be selected first and then the workflow and number of bits may be designed around the selected dual deterrent IIO. In another embodiment, the workflow and the number of bits may be selected, and then the dual deterrent IIO may be selected to fit the specifications of both the workflow and the total number of bits to be carried. For example, the dual deterrent IIO may contain all needed tiles for every step in the workflow upon creation of the dual deterrent IIO.

In embodiments in which the dual deterrent IIO is selected after the total number of bits is identified, the identifying object registry 104 may consider the total number of bits to be written to the dual deterrent IIO and whether it is desirable to include entropy in the identifying object. At this stage, other considerations may also be taken into account, such as to include non-payload indicia in the identifying object and what type of associated mark will be used in concert with the IIO to form the dual deterrent IIO. Further, the relationship, if any, between the data in the IIO and in the associated mark may be selected.

The probability of guessing the initial state with less than a specified statistical probability may be added prior to the initiation of the workflow by partially filling available tiles of the dual deterrent IIO. It can be understood that a partially completed state of the dual deterrent IIO has greater security (statistically) than an all-white state of the dual deterrent IIO. Thus, in the embodiments disclosed herein, the "entropy" can be modified by the writing of an initial bitstream, so that the number of non-white tiles is p, where 0<p<1, the number of twice-altered tiles is roughly p^2, etc.

The introduction of non-payload indicia (NPI) may also affect the size of the dual deterrent IIO because non-payload indicia are included in tiles of the dual deterrent IIO that may have otherwise been written to with bits. As described above, NPI do not contain bits, but rather are used for calibration, for example, to correct skew, calibrate intensity, and calibrate orientation of the dual deterrent IIO, at each stage in the workflow. NPI may also be used for branding, symbology identification, or the like. When it is desirable to include NPI, the number of tiles to be used for the NPI may be accounted for in the total number of tiles that are used for the dual deterrent IIO.

In one embodiment, the IIO, the associated mark, the workflow, and the number of bits are created at the identifying object registry 104. The identifying object registry 104 includes a non-transitory, computer-readable medium with a computer program for selecting the dual deterrent IIO, a number of stages in the workflow, a security level for each stage in the workflow, and a number of bits to be written at each stage in the workflow. The number of elements may be preselected before the workflow is initiated or dynamically determined as the workflow is in progress.

The workflow and preset number of bits may be set or defined using information received at the identifying object registry 104 from one or more participants in the workflow. For example, a product manufacturer may request that a workflow be set up for a particular product, and may provide information to define the workflow, including such information as the distributor, the retailer, and product identification information, such as the serial number. The identifying object registry 104 may then select a suitable dual deterrent IIO, generate a suitable workflow, and preset payload information and the associated mark based upon this information. The dual deterrent IIO and the preset number of bits may also be set by the workflow and, thus, can be accessed (or looked up) using a number of methods.

In the embodiment described with respect to FIGS. 1-5, the workflow may involve three stages, for example, a manufacturer, a distributor, and a retailer. At each stage, the workflow may require an individual to sign a document, such as by overprinting the dual deterrent IIO associated with the product, prior to shipping the product and document to the next entity, and may require an individual receiving end to sign the document upon receiving the product and document.

As described herein, the number of bits to write to the dual deterrent IIO at each stage of the workflow is proportional to the desired minimum level of security, on a statistical basis, at any given stage. High-level security stages may write more bits of information to the dual deterrent IIO, while low-level security stages may write less bits of information to the dual deterrent IIO. The number of bits to encode at each stage of the given workflow may be based on probability. For example, what level of confidence is needed so that the next state of the dual deterrent IIO has less than a p probability of being guessed. Hamming distance may also be used in the determination of the number of bits. As described herein, Hamming distance is the sum of bits, defined in the elements of the dual deterrent IIO that are different from one stage to the next. The associated mark may also be used to determine the number of bits, as the associated mark may increase the complexity of the dual deterrent IIO, making guessing an IIO code less probable.

Once the workflow is generated, including the various stages and the number of bits to be encoded in total and at each stage, and the dual deterrent IIO is selected, the workflow is initiated. The workflow instructions may be transmitted electronically to at least the first stage system 102. The instructions may include, for example, the procedural rules for the transmission of the product, the actions, or purposes associated with the product, and either the total number of bits to encode or the number of bits to encode in the product's dual deterrent IIO at each stage in the workflow. Further, the workflow instructions may include rules for creating and adding to the associated mark.

In one embodiment, the systems used during subsequent stages in the workflow receive the instructions from the first stage system 102 or from a system used in previous workflow stage. In another embodiment, the systems 108 or 110 used during subsequent stages in the workflow may retrieve the instructions from the identifying object registry 104, for example, via a network 106. In another embodiment, the workflow may be initiated without transmitting the workflow instructions. For example, the document and its associated dual deterrent IIO may be transmitted to the first stage system 102 in the workflow. It is to be understood that as long as the starting point of the workflow is known, one can deduce each stage of the workflow.

The method starts at block 1002 by imaging a dual deterrent IIO. The imaging may be performed by a bar code reader 130, a software object, a scanner, a camera, or any other suitable imaging device or code. The dual deterrent IIO, including the IIO and the associated mark, is isolated or segmented from the surrounding content, such as by the use of non-payload indicia (NPI) that delineate the edges of the IIO. At block 1004, an image correction and calibration is performed. Calibration may involve orienting the dual deterrent IIO using the non-payload indicia, dewarping the IIO, dewarping the associated mark, deskewing the IIO and the associated mark, calibrating the possible intensity levels, and the like. The calibration may be performed in conjunction with interpretation of the dual deterrent IIO, or calibration may be performed and then interpretation of the dual deterrent IIO may be performed.

At block 1006, the image may be analyzed to determine the previous code in the IIO and the previous information in the associated mark. This may be performed by incrementally determining the bits written to the tiles to generate a bitstream. For example, the bitstream may be determined by reversing a procedure used to write the bits. The bitstream may then be decoded using a public key to decode a bitstream encoded with a corresponding private key. Any number of techniques may be used to encode and decode the data between workflow stages, including the private/public key system, generation of an encoded numerical hash of the code, and the like. Further, in some embodiments, an identifying object registry 104 may be used to confirm the bitstream without further decoding, such as if the dual deterrent IIO effectively stored a secret string, nonce, or the like.

At block 1008, the associated mark may be used to confirm the code in the IIO. This may be performed by testing the relationships discussed with respect to FIGS. 8 and 9. For example, if the IIO includes more information than a percentage of completion associated mark indicates, than the dual deterrent IIO fails the confirmation. In some embodiments, the information in the associated object may be independent of the information in the IIO. In these embodiments, the information in each may be independently used or confirmed.

At block 1010, the code may be confirmed to validate the identity of the document and the previous stage. For example, this may be performed by querying the identifying object registry 104 with the bitstream. The code from the associated mark may also be sent. In some embodiments, the confirmation may be performed by comparing the decoded value to an expected value at a local stage system.

Once the confirmation has been performed, at block 1012 a new bitstream may be generated with a current code, for example, related to the current work stage. Information to be used to create a new associated mark may also be generated. The new bitstream may be an encrypted version of a hash, for example, generated using a private key. In some embodiments, a new bitstream may be obtained from an identifying object registry 104 along with the information for creating the new associated mark.

At block 1014, the new bitstream may be written over the IIO in the current dual deterrent IIO. The stage system 102, 108, or 110 performing the incremental writing may determine the location of remaining available candidate areas that can be written to, for example, tiles that are not already carrying NPI or are full. A variety of algorithms may be used to determine where to place the information, which may include a preset number of bits. Non-limiting examples of these algorithms include scrambling, random/nonce, one-time-pad, encryption, data replication, etc. These techniques identify where the information can be added to the IIO. This may include identifying open tiles for data and writing the bitstream to the open tiles.

In one embodiment after the available candidate areas in the IIO portion of the dual deterrent IIO are identified, the first stage system 102 identifies or retrieves the preset number of bits, for example, from the workflow instructions, to be written. In some embodiments, the number of bits to be written at a particular stage may be determined automatically by the stage system 102, 108, or 110 performing the incremental writing or by a user. In these embodiments, the total number of bits to be encoded throughout the workflow is known, and the stage system 102, 108, or 110 at each workflow stage would add a suitable amount of information to the IIO. For example, a string containing 0's and then 1's incrementally to be written could be stored as a nonce and then the 1's would be incrementally written to the IIO stage by stage.

When determining how to write the information, the stage system 102, 108, or 110 will use the information from segmentation to identify the then-current intensity levels of the available candidate areas of the IIO in the dual deterrent IIO. When determining how to write the information, the stage system 102, 108, or 110 will select a scrambling technique by identifying an algorithm to be used for incorporating the information for the current workflow stage. This algorithm may be random or nonce-based, or may be deterministic.

In instances where the workflow 200 is based on the identifying object registry 104, as discussed with respect to FIG. 2, the previous state of the IIO in the dual deterrent IIO may be replicated using the network 106, so that random or nonce methods are valid when inputting new information. For example, the information to be added is provided by a random number generator and is stored in the identifying object registry 104. In this example, the newly added bits are randomly added, and the identifying object registry 104 can provide and store the random new bits.

In instances where the independent incremental workflow 300 is used, as discussed with respect to FIG. 3, each workflow stage may use an intelligent hash of the previous state of the IIO. In this example, a deterministic approach may be used, in which the newly written information is determined from the current state of the IIO and any additional pre-populated information that distinguishes the dual deterrent IIO from other IIOs on the product, such as SKU specific information and mass serialization information. In one embodiment, the IIO within the dual deterrent IIO may be pre-populated with the SKU specific information and mass serialization information to ensure each dual deterrent IIO is unique. In another embodiment, if a document has other unique information, such as a routing number or another barcode/stock identifier for point of sale, the other unique information can be included in a digital signature, such as the output of an operation on a binary string using a private key, to create the next set of bits to write to the IIO.

When determining how to write the information, the stage system 102, 108, or 110 will also select a manner in which the state change results in a predictable change in the IIO within the dual deterrent IIO. In one embodiment, this may be accomplished when a binary string representation of the current state of the IIO is transformed with a security string, such as by using a private key to encrypt a binary string. When determining how to write the information, the stage system 102, 108, or 110 will also identify a writing scheme, for example, as described above with respect to FIG. 8 which may be suitable for the then-current stage of the workflow.

The stage system 102, 108, or 110 performing the incremental writing at workflow stage I then writes the information to the IIO to form a new dual deterrent IIO. When writing, the stage system 102, 108, or 110 may use the incremental intensity or color process, the selected scrambling technique, the selected manner for achieving a predictable state change, and the selected writing scheme to write the information to the dual deterrent IIO. During each writing stage in the workflow, previously written information is not generally removed or changed, but rather the additional information is added, changing the state of the dual deterrent IIO.

While the number of bits to be written is preset in one embodiment, the actually writing of the information may take place dynamically as the workflow progresses. As such, the candidate areas that are actually written to are determined in real time according to, in part, the areas available for writing, the number of bits to be written and the algorithms to be used.

At block 1016, a similar process may be used to overwrite information to the associated mark in the dual deterrent IIO. For example, another section of an associated mark indicating the amount of information carried in the IIO may be completed, as discussed with respect to FIG. 8. In other embodiments, new parity bits may be calculated and text characters, or other marks, indicating the parity of the rows and columns in the IIO may be written over the IIO.

The product and the dual deterrent IIO, such as a document, can be printed and stored. When the dual deterrent IIO is completely physical, the document with the dual deterrent IIO printed thereon as it was received can be overprinted so that the newly written to areas will be filled in the printed version. When the dual deterrent IIO is physical and electronic, the electronic version of the document and the incrementally written to dual deterrent IIO can be reprinted or overprinted, if desired. When the incrementally written to dual deterrent IIO is saved, it is to be understood that it will replace any prior versions of the dual deterrent IIO.

The product and incrementally written to dual deterrent IIO are then shipped, electronically or physically, to the next entity in the workflow, such as workflow stage II system 108, as described with respect to FIG. 1. Similarly, when the action, task, etc. set forth in the workflow stage II instructions have been performed, the dual deterrent IIO is incrementally written to according to the workflow stage II instructions, for example, following the same method 1000. The document and its incrementally-overwritten dual deterrent IIO can then be printed and stored by the workflow stage II system 110, which adds its increment to the dual deterrent IIO.

At each stage, the previous states of the dual deterrent IIO are still provable because there are no new available candidate areas in the later stages of the dual deterrent IIO. In embodiments where the stage system 102, 108, or 110 at a stage in the workflow has access to all the rules governing writing at the previous stages, the stage system 102, 108, or 110 can automatically check all previous states of the dual deterrent IIO for validity when checking the then-current state.

In any of the embodiments disclosed herein, if multiple identifying objects are part of the same shipment, it may be desirable to have the same pre-filled set of data bits. Embodiments of the dual deterrent IIOs disclosed herein retain the set real estate on a document even through information is incrementally written thereto throughout a workflow. The state of the dual deterrent IIO and the then-current stage of the workflow may be determined directly from the intensity of the tiles and the percentage of the tiles that are filled in or saturated, even without knowing how to interpret the data embedded therein.

Figure 11:
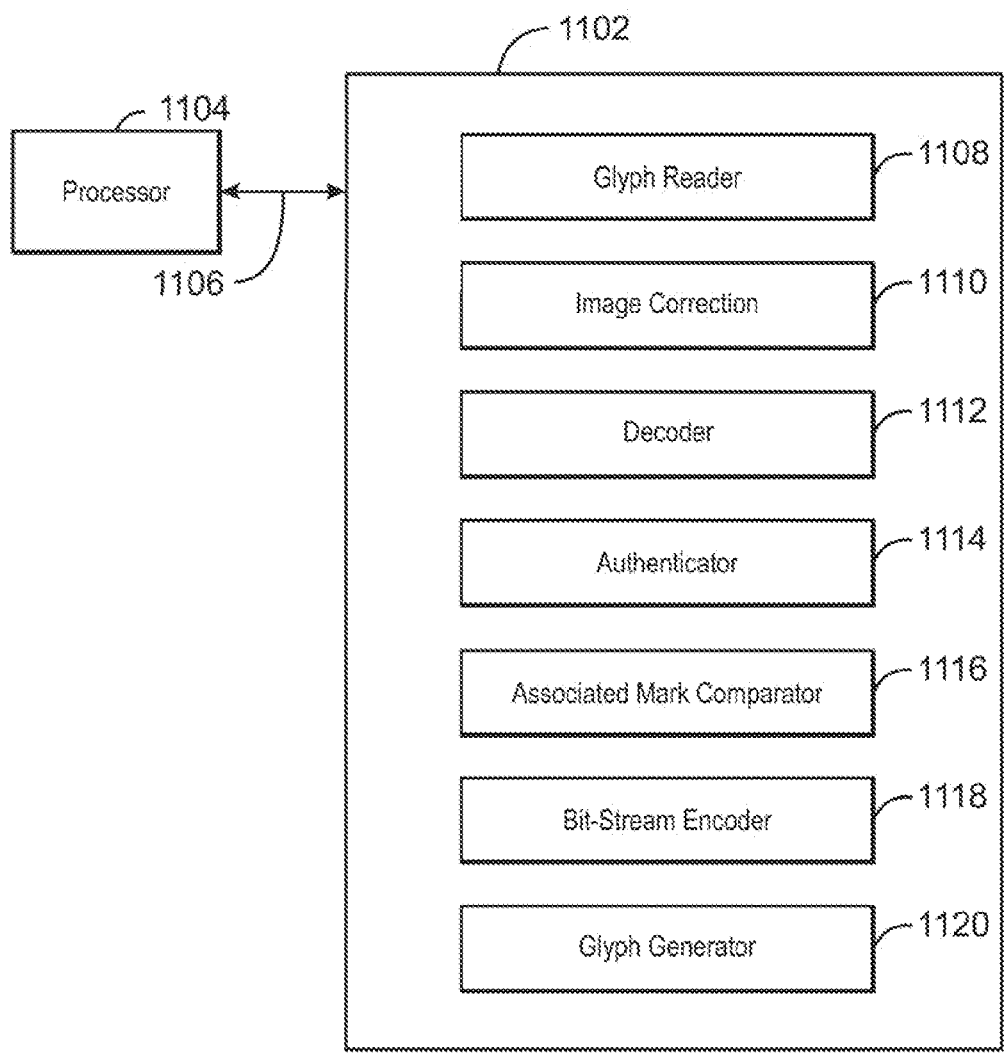
FIG. 11 is a block diagram of a non-transitory, computer readable medium containing code for confirming a product in a workflow using an IIO having a multi-level gray scale in accordance with an embodiment.

FIG. 11 is a block diagram 1100 of a non-transitory, computer readable medium 1102 containing code for confirming a workflow using an IIO having a multi-level gray scale in accordance with an embodiment. A processor 1104 may access the non-transitory, computer readable medium 1100 over a bus 1105, or other communication system, to obtain code configured to direct the processor 1104 to confirm a product based on a dual deterrent IIO associated with the product. The non-transitory, computer readable medium 1102 may include any combination of read only memory (ROM), random access memory (RAM), hard drives, optical drives. RAM drives, or flash drives.

The non-transitory, computer readable medium 1102 may include a module 1108 to read a dual deterrent IIO and a second module 1110 to correct the image and calibrate the reader. Another module 1112 may decode the dual deterrent IIO to generate a first bit stream. A module 1114 may confirm the code, for example, by following the instructions that should have resulted in the current dual deterrent IIO, or by accessing an identifying object registry. The authenticator 1114 may work with another module 1116 to confirm the dual deterrent IIO by comparing the information in the IIO to the information in the associated mark. A bit-stream encoder module 1118 may generate the codes needed to create the IIO and the associated mark. Another module 1120 may then identify open tiles in the IIO and open space in the associated mark and overwrite the additional information onto the dual deterrent IIO.

What is claimed is:

1. A system for generating a dual deterrent incremental information object (IIO), comprising:
   a processor; and
   a memory, wherein the memory comprises computer readable code configured to direct the processor to:
   analyze a dual deterrent IIO to identify an IIO comprising a plurality of tiles, wherein the IIO comprises a first code;
   analyze the dual deterrent IIO to identify an associated mark associated with the IIO; and
   confirm the first code, and, if the first code passes the confirmation:
   generate a second code comprising a bitstream; and overwrite the bitstream onto the IIO by changing a color, an intensity, or both, of a tile within the plurality of tiles to form an updated IIO;

generate a new associated mark, wherein the new associated mark is related to the updated IIO; and overwrite the new associated mark onto the associated mark.

2. The system of claim 1, wherein a tile within the IIO represents encoded data by differing levels of intensity, differing colors, or both.

3. The system of claim 1, wherein the dual deterrent IIO is associated with a printed document, an electronic document, or a packaged product, or any combinations thereof.

4. The system of claim 1, comprising a device configured to overprint the bitstream onto a dual deterrent IIO physically located on the product.

5. The system of claim 1, comprising a handheld device, a mobile device, or a bar code reader configured to read the dual deterrent IIO.

6. The system as defined in claim 1, wherein the memory comprises computer readable code for setting entropy in the dual deterrent IIO at a start of a workflow.

7. The system as defined in claim 1, wherein the associated mark comprises an indicator of the amount of information stored in the dual deterrent IIO.

8. The system as defined in claim 1, wherein the memory comprises computer readable code for setting non-payload indicia (NPI) in the dual deterrent IIO.

9. The system as defined in claim 1, wherein the associated mark comprises a parity check of the associated IIO.

10. The system as defined in claim 1, wherein the associated mark comprises a compressed version of the associated IIO.

11. The system as defined in claim 1, wherein the associated mark comprises a signed version of the associated IIO.

12. The system as defined in claim 1, wherein the associated mark comprises a scrambled version of the associated IIO.

13. The system as defined in claim 1, comprising a bar code reader configured to read a security mark and display an associated mark consistent with the IIP in the dual deterrent IIO.

14. A method for generating a dual deterrent information object (IIO), comprising:

analyzing a dual deterrent IIO to determine a first code, wherein the dual deterrent IIO comprises an IIO comprising a plurality of tiles and an associated mark, wherein each tile in the plurality of tiles represents a data element encoded by color, intensity, or both, and the associated mark comprises information related to the IIO; and confirming the first code, and, if the first code passes the confirmation:

generating a new code comprising a bitstream;

overwriting the bitstream on the plurality of tiles by changing a color, an intensity, or both, of a tile within the plurality of tiles;

generating a new associated mark related to the dual deterrent IIO; and overwriting the associated mark with the new associated mark.

15. The method of claim 14, wherein confirming the first code comprises, at least in part, comparing the associated mark to information in the IIO to confirm that the information in the associated mark is consistent with the information in the IIO.

* * * * *

UNITED STATES PATENT AND TRADEMARK OFFICE
CERTIFICATE OF CORRECTION

PATENT NO.       : 8,915,450 B2                                    Page 1 of 1
APPLICATION NO.  : 13/989785
DATED            : December 23, 2014
INVENTOR(S)      : Steven J. Simske et al.

It is certified that error appears in the above-identified patent and that said Letters Patent is hereby corrected as shown below:

On the Title page, in item (54) and in the Specification, in column 1, line 1, Title, delete "DETERENT" and insert -- DETERRENT --, therefor.

Signed and Sealed this
Twenty-eighth Day of April, 2015

Michelle K. Lee
*Director of the United States Patent and Trademark Office*